United States Patent [19]

Ammons

[11] Patent Number: 4,792,700
[45] Date of Patent: Dec. 20, 1988

[54] WIND DRIVEN ELECTRICAL GENERATING SYSTEM

[76] Inventor: Joe L. Ammons, 1617 Lawson La., Amarillo, Tex. 79106

[21] Appl. No.: 38,240

[22] Filed: Apr. 14, 1987

[51] Int. Cl.$^4$ .................................................. F03D 9/00
[52] U.S. Cl. ........................................ 290/55; 290/44; 416/119; 416/132 B; 416/117; 416/DIG. 6
[58] Field of Search ....................... 290/55, 44, 54, 43; 416/119, 132 B, 117, 142, 240, DIG. 6, DIG. 8

[56] References Cited

U.S. PATENT DOCUMENTS

| | | | |
|---|---|---|---|
| 3,743,848 | 7/1973 | Strickland | 290/55 |
| 4,248,568 | 2/1981 | Lechner | 416/132 B |
| 4,457,669 | 7/1984 | Corry | 416/119 |
| 4,494,007 | 1/1985 | Gaston | 290/44 |
| 4,545,729 | 10/1985 | Storm | 416/132 B |

FOREIGN PATENT DOCUMENTS 1164459  6/1985  U.S.S.R. ................................ 290/55

*Primary Examiner*—William M. Shoop, Jr.
*Assistant Examiner*—Sharon D. Logan
*Attorney, Agent, or Firm*—Richard C. Litman

[57] ABSTRACT

A wind driven electrical generating system consisting of a post with guyed cable supports, a spinner cage mounted on a square wheel on a circular race, sail elements on the spinner cage, a swash plate mounted upon under side of spinner cage and providing an inclined work surface, a rocker arm mounted for vertical displacement and having upper and lower ends, a caster follower member mounted on an upper end of the rocker arm for engaging the swash plate as it rotates, a double acting hydraulic cylinder driven by the lower end, and hydraulic motor responsive to the double acting hydraulic cylinder, and an electric generator driven by the hydraulic motor to produce electric current.

8 Claims, 6 Drawing Sheets

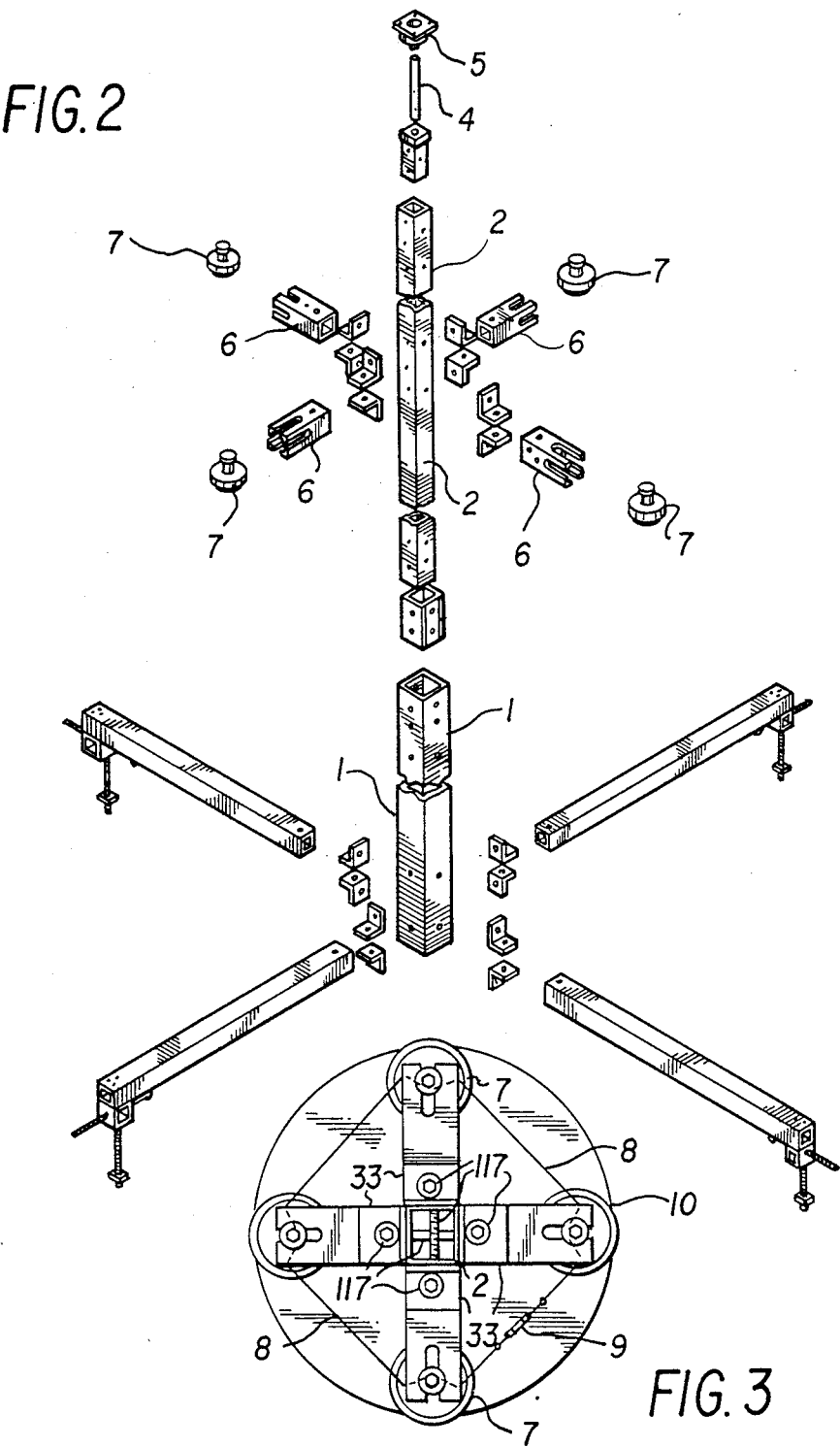

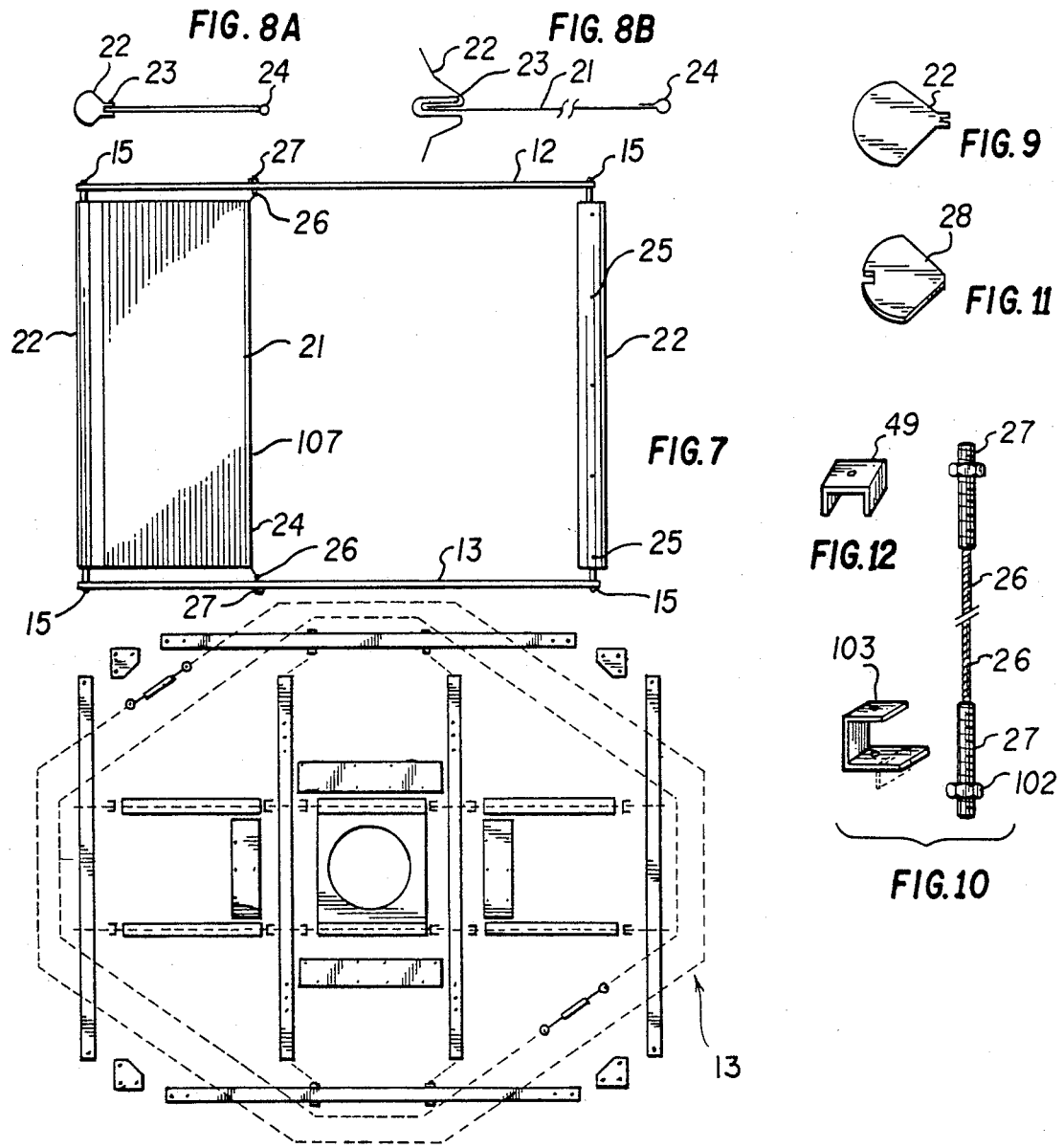

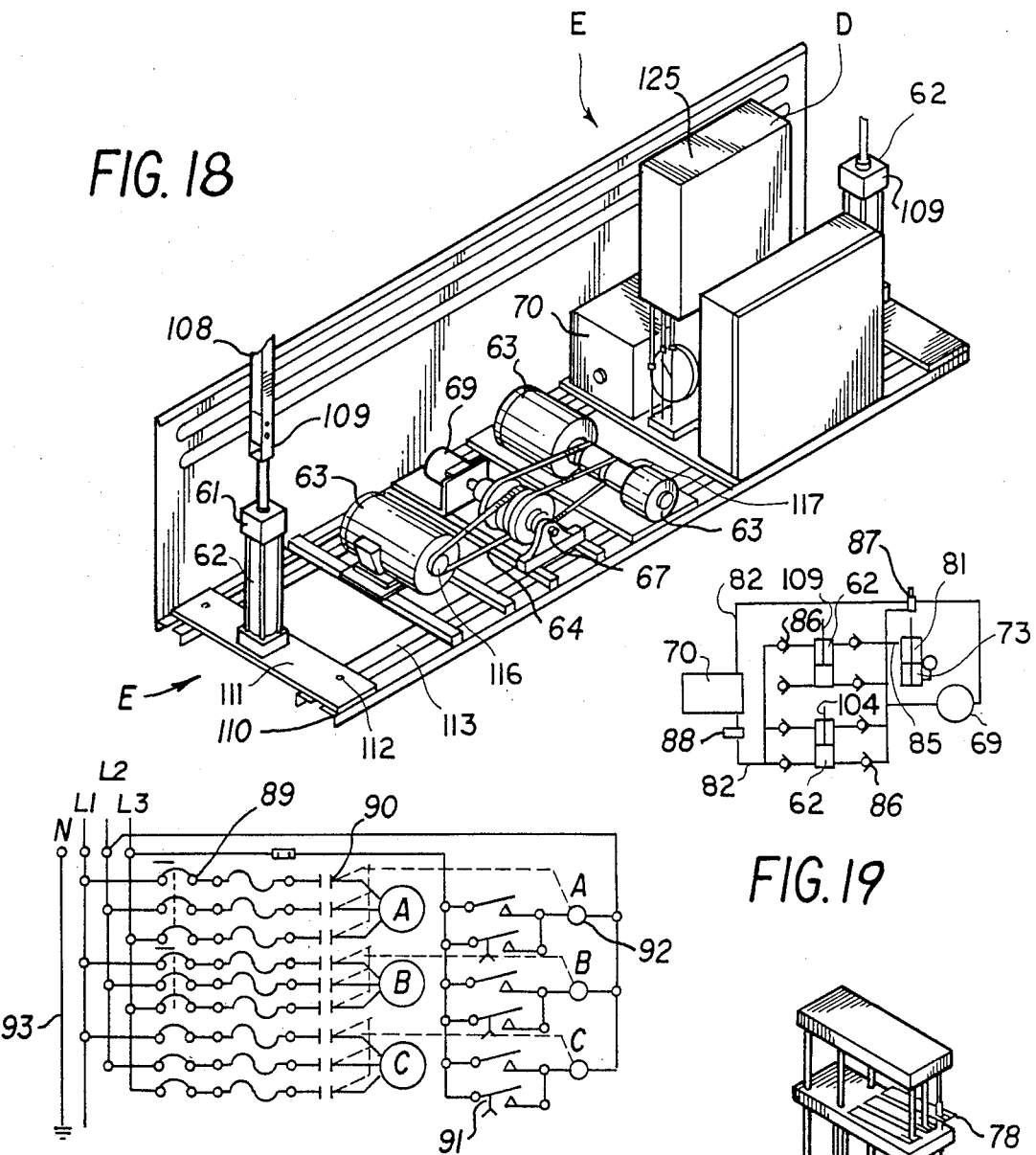
FIG. 18
FIG. 19
FIG. 20
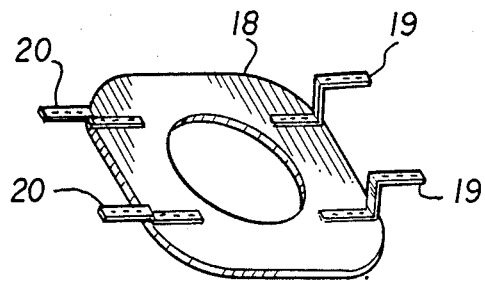
FIG. 6
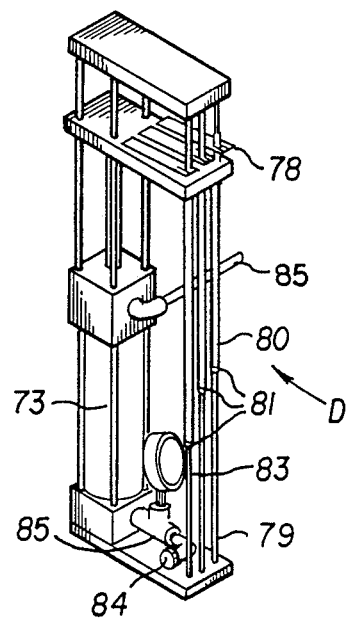
FIG. 21

WIND DRIVEN ELECTRICAL GENERATING SYSTEM

BACKGROUND OF THE INVENTION

1. Field of the Invention

The invention relates to an improving wind-driven electrical generating system, and more particularly, the invention is directed to an improved wind-driven mechanical-hydraulic-electrical generating system consisting of a post with guyed cable supports, a spinner cage mounted on a square wheel on a circular race, sail elements on the spinner cage, a swash plate mounted upon under side of spinner cage and providing an inclined work surface, a rocker arm mounted for vertical displacement and having upper and lower ends, a caster follower member mounted on an upper end of the rocker arm for engaging the swash plate as it rotates, a double acting hydraulic cylinder driven by the lower end, a hydraulic motor responsive to the double acting hydraulic cylinder, and an electric generator driven by the hydraulic motor to produce electric current, as more particularly and specifically described herein.

Basically, the invention is a windspinner electric generating system consisting of a main shaft sufficiently tall to allow a spinner to catch the wind above any nearby edifices, houses, trees, and the like. The main shaft is held firmly by guy lines anchored to a base which is attached to a concrete foundation. The spinner rotates around the main shaft revolving on bearings installed on the main shaft. The spinner is a cubic framework having specially constructed sails installed at each of four corners. As the wind strikes these sails the spinner rotates, carrying a swash plate beneath it which is set upon the wheels of four swivel casters. These casters are installed on the ends of two rocker arm assemblies which are swiveled on bearings installed on the main shaft. These two rocker arms are tied through connecting rods to two double acting hydraulic cylinders in a cabinet at the base. As the spinner turns, the swash plate imparts a reciprocating motion to the connecting rods which causes the hydraulic cylinders to pump fluid around a hydraulic circuit. This fluid passes through a hydraulic motor which is coupled to a jack shaft to drive one or more alternating current induction type generators. The fields of these generators are controlled so they may be connected into the alternating current network of the utility company so that the current which is cogenerated is in exact synchronization with the current which the company supplies. As the hydraulic fluid circulates, it also enters another hydraulic cylinder whose piston works against a permanent fixed gas pressure captured in the cylinder. When the hydraulic pressure rises above this fixed air pressure, it causes the piston and shaft of the hydraulic cylinder to begin to retract. This action closes a switch and connects the first generator into the utility lines so that it begins generating. As the wind rises, the hydraulic pressure increase, causing further retraction of the control cylinder and switches on other generators. As the wind speed declines, the hydraulic pressure drops and begins shutting down the generators to keep the system output in equilibrium with the input wind energy. When the wind energy is very low, as an example below 7 mph, the spinner may continue to rotate slowly but the hydraulic pressure may be too low to bring the generators in. This will prevent the generators from dropping down into motor speeds and use electric current instead of generating it. When the wind speed is above 40 to 50 mph it might tend to drive the generators into overspeed and overload. When the hydraulic pressure approaches this condition, the relief valve opens and bypasses some of the fluid back into the tank.

The speed of the entire system is fairly constant. In operation when the generators begin to approach overspeed, another generator is switched on which tends to slow down the system. With a proper selection of generator sizes, as one example, three generators, $\frac{1}{2}$ HP, 2 HP and 5 HP will hold the standard spinner to a fairly constant speed up to 40 mph winds and produce approximately 5 KW at 25 mph windspeed at about 80% full load.

If wind speeds above 40 mph occur, usually gusts, the spinner will continue to gradually accelerate in speed but the output will remain at a constant maximum. The increased speed will not harm the spinner since these spinners have been tested to withstand winds up to, tornadic strength without any load connected.

In addition to its function as a control, the cylinder also acts as a ripple suppresser, absorbing or releasing fluid in the circuit when changes in entering fluid pressure occur.

The sail arrangement used in the spinner system cannot be classified as an airfoil although there is a slight tendency to act as an airfoil at certain moments in its rotation. It cannot be classified as a lift and drag system although there is a very slight drag at intervals in its rotation. Instead it operates more nearly like the sails on a ship which extract energy from the wind as it strikes the sail surface, turns and jets off of the farther edge. All four sails of the machine or apparatus are in the wind, whether front side or back side for roughly 80% of the orbit. The sail construction as well as its angle of approach causes a nose portion of the sail to be driven forward in the same direction whether it is moving away from the wind or forward into the wind. The only time this may not be true is when the rear sail is shaded by the front sail and which leaves only three sails in the wind. When the front and back sails come squarely into the wind, two of the others shut off. In neither of these cases is there loss of power. In fact, the formula $A \times 0.0051 \times V3 \times \text{Eff.} = $ Watts, can be used to predict the output of the system, where A = Area: height of sail × long axis of the spinner
V3 = wind velocity in mph, cubed
0.0051 = the power in watts applied to 1 square foot at 1 mph windspeed, and
Eff. = efficiency of impellor in extracting applied energy.

This formula has shown the system of the invention to gain an efficiency of around 40% which is considered very good for any wind-driven propeller of any configuration.

The angular improvement of the sail operation over similar machines is that the sails may remain in fixed position on the impellor by hanging the sails on a square shaped base instead of a round wheel structure.

2. Description of the Prior Art

Various prior art patents or known prior uses teach and disclose various types of wind-driven energy conversion generating systems or devices of sorts; and various manufactures and the like, as well as methods of their construction, are found to be known and exemplary of the following U.S. prior patent art:

| U.S. Pat. No. | Inventor |
| --- | --- |
| 4,048,947 | C. A. Sicard |
| 4,129,787 | F. N. Palma |
| 4,248,568 | W. L. Lechner |
| 4,494,007 | E. E. Gaston |
| 4,527,950 | L. I. Biscomb |
| 4,545,729 | J. Storm |

Gaston shows a wind machine for generating power in which the machine uses a feathering vane controlling a sprocket assembly for changing the orientation of blades, a damper for avoiding excessive speeds due to gusts of wind, and an induction generator driven to produce current output.

Lechner merely shows a rotor blade arrangement and controller restraint means for individual blades of the rotor which are entirely practical and automatic in operation regardless of wind direction, so as to assure rotor startup and continued rotation in the same direction when wind is impinging on the rotor from any point on the compass.

In Storm is disclosed a circular shaped wind turbine apparatus having a plurality of sail elements secured to a circular frame rotatable in response to wind acting on the sail elements, each of which respond to wind velocity; and Palma discloses a triangular shaped wind turbine with fixed and pivoted blades attached to a revolving ring base performing as an armature of an energy converter with a current output.

Sicard teaches use of a rotary device driven by a moving fluid such as water or air which can be used to drive any appropriate device such as a pump, an electric generator or a screw, and Biscomb similarly teaches a wind motor.

Historically there have been two major classifications of wind turbines; one, the airfoil impellors such as the propeller or the Darrieus eggbeater and two, the lift and drag impellors such as the Sibelius vertical axis turbine or the windcup used to measure wind velocities. Of the two systems, the airfoils are generally considered to be much superior because of their higher speeds and greater efficiency. However, a use of the airfoils have the disadvantage of reaching such high speed velocity in heavy winds that they will self-destruct if not feathered down or shut off in high winds. This makes them much more expensive to manufacture or much less efficient when they must be shut down. In addition, most airfoils are one-dimensional and the only way their output can be increased is by lengthening them in the one dimension. Lift and drag systems, on the other hand, are much more reliable in high winds but are very inefficient in lower winds because of the drag working against the back of the cup offsetting much of the life working against the face of the cup. Many systems have been devised to minimize this drag but have been generally unsuccessful because of their higher cost and excessive triggerwork. However, a third classification has been used for centuries to drive sailing ships in any directions by altering the attitude (altitude) of the sails in to the wind. This, too, has been widely experimented with in the operation of wind-driven impellors but has also been largely unsuccessful because of costs and triggerwork. Several examples of this class of impellor were found in the above patents.

These patents or known uses teach and disclose various types of wind-driven energy conversion generating systems or devices, but none of them whether taken singly or in combination disclose the specific details of the combination of the invention in such a way as to bear upon the claims of the present invention.

SUMMARY OF THE INVENTION

An object, advantage and feature of the invention is to provide a simple, rugged, non-directional, highly efficient, and low-cost wind-driven impellor system which is light in weight and built for substantial permanence; a simple, rugged, long-lasting bearing system for withstanding the many forces affecting operation of a wind operated generated system; and a method and system of elements of reinforcing and rigidifying the lightweight structure of an impellor to withstand forces of wind and to reduce effects of inertia.

Another object of the invention is directed further to a device or system for responding to changes in incoming wind energy for conversion into a uniformly characterized output in electrical energy; for transmitting low speed rotary motion to high speed rotary motion and thus into electrical energy with a minimum of energy loss; for changing rotary motion to reciprocating motion; a simple method of converting reciprocating motion into hydraulic fluid energy, a hydraulic system which will smoothly accelerate or decelerate the transmission of incoming wind energy from the impellor into the electrical generating system; a flexible generating system which will respond to changes in wind energy from very low 7 to 10 mph wind speeds to gale force winds with corresponding increase and decrease in electrical output; for protecting from overload or over speed at high wind speeds while still delivering a generally maximum output; a wind-driven generation system which will turn at a fairly constant speed, varying over a very narrow range from low wind speed to very high wind speed; a wind-driven generation system simple enough in construction that it can be built of common materials which can be cut, drilled or otherwise prefabricated, then gathered into a bundle and shipped anywhere in the world for assembly at an erection site; for providing a damper to reduce or eliminate surges and ripples in the fluid flow through a hydraulic transmission system, and for providing a complete structure and system that generally meets all requirements of environmental protection standards, rules, policies and mandates.

Also an object of the invention is to provide a simple and direct method for the improved construction of a wind-driven electrical generating system.

Another object of the invention is to provide a novel and improved wind-driven electrical generating system that is about forty feet or 12 meters in height where the tower becomes an integral part of the transmission system which may be almost completely assembled while lying horizontally on the deck or ground, thereafter readily raised to a vertical position where the assembly may be finished at that level; a wind driven generation system low enough in overall manufacturing, shipping, assembly and erection costs that it pays its own costs in a period of from 3 to 5 years; a method of guying, cinching and rigidifying a main shaft and base of the structure to withstand high winds without encountering excessive costs; a method of providing a foundation to prevent a toppling of the structure; a system where the transmission and generating equipment is located at ground level for easy access and service and which is protected from the elements, and to provide, finally, a means or system of cooling a hydraulic and electric generating system.

These together with other objects and advantages which will become subsequently apparent reside in the details of the process and operation thereof as more fully hereinafter is described and claimed, reference being had to the accompanying drawings forming a part hereof, wherein like numerals refer to like parts throughout.

DESCRIPTION OF THE SEVERAL VIEWS OF THE DRAWINGS

FIG. 2 is an exploded view of a base, lower main shaft, upper main shaft and other details of FIG. 1B.

FIG. 3 is a sectional view taken along lines 3—3 of FIG. 1B.

FIG. 4 is a perspective view of the spinner cage of the invention.

FIG. 5 is an exploded view of the wheel base.

FIG. 6 is a perspective view of the swash plate assembly of the invention.

FIG. 7 is a view of the spinner sail assembly.

FIG. 8A is a top view of the sail.

FIG. 8B is a top view of the sail being assembled.

FIG. 9 is the nosepiece of the sail.

FIG. 10 shows the details of the securing members of the sails.

FIG. 11 shows an alternative to FIG. 9.

FIG. 12 shows a slide for assembling the sail to the spinner cage.

FIG. 18 is the hydraulic and generator system.

FIG. 19 is a hydraulic system diagram.

FIG. 20 is the electrical system diagram.

FIG. 21 is the pressure regulator and tilt switch generator control.

DESCRIPTION OF A PREFERRED EMBODIMENT OF THE INVENTION

In a total of five means and steps wind energy is converted to various mechanical and hydraulic forms to, finally, conversion to electrical energy.

Figure 1A:
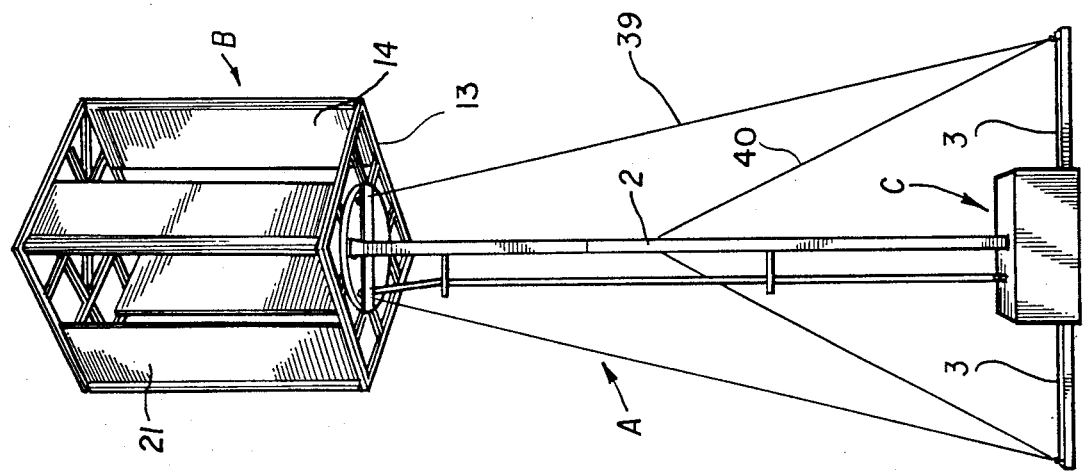
FIG. 1A is a perspective view of an improved wind driven electrical generating system and illustrating a typical installation of the wind driven electrical generating system according to a preferred embodiment and best mode of the present invention.
Figure 1B:
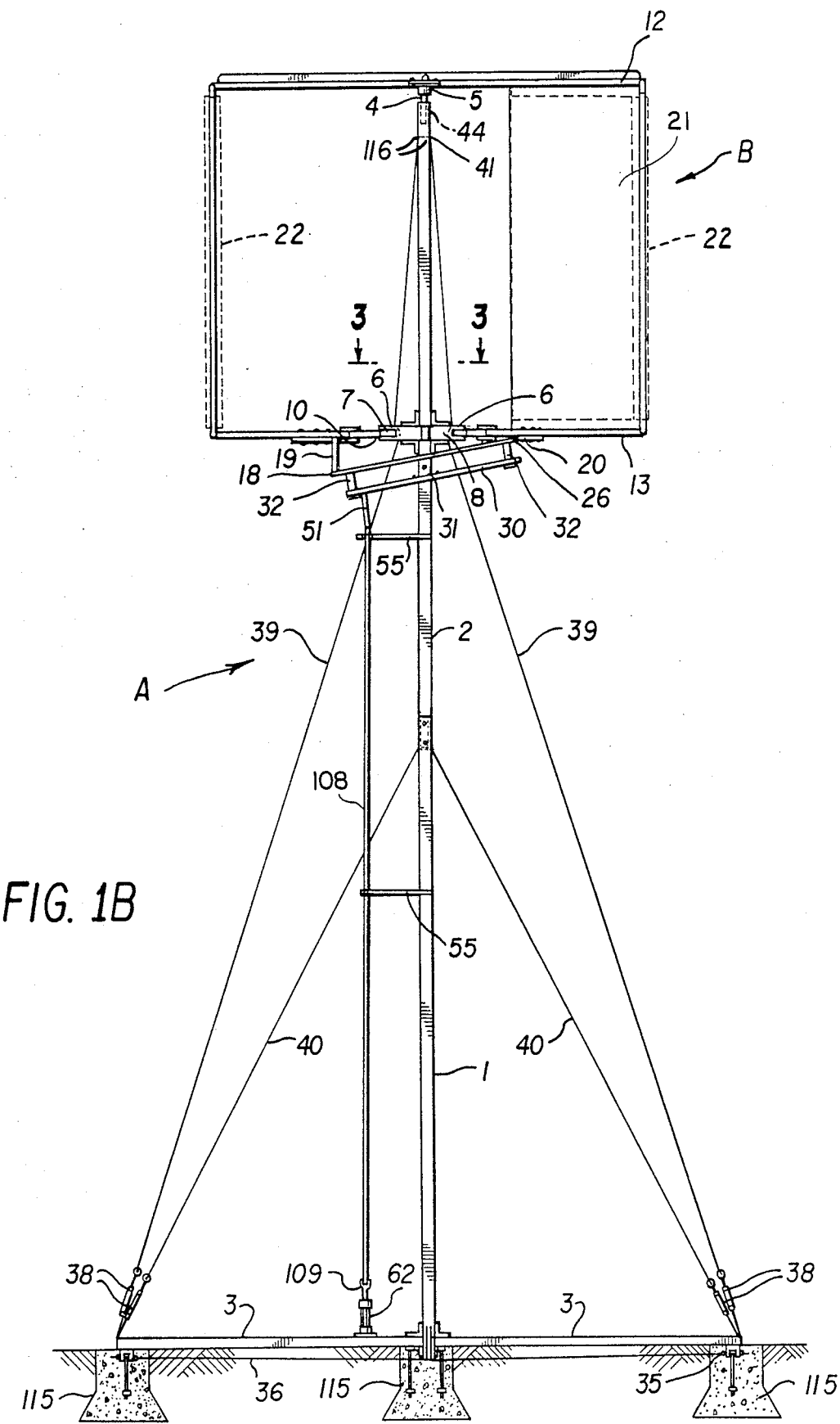
FIG. 1B is an elevational view of the improved wind driven electrical generating system and embodying the concepts of the invention.

Referring now to the drawings there is shown in the FIGS. 1A-1B an improved wind driven electrical generating system A constructed of a lower vertical post 1 and an upper main post 2 and having guyed cable supports 39, 40 secured at ground anchors 115 by turnbuckles 38. The posts 1, 2 are also secured at ground anchor 115 and its upper end 2 engages in rotary relation a windspinner B to be described further in detail below. A machinery control cabinet or housing C in FIGS. 1A and 18 provides for location of such components as a mechanical-hydraulic-electrical conversion system D, E as shown in FIGS. 18 and 21. The windspinner B FIGS. 1A and 1B comprises a spinner cage F FIG. 4 bottom-mounted on a square base 13 FIGS. 1A and 1B for rotation on a circular race 10 as shown in FIGS. 1B and 3 for riding on a post 6 as shown in FIG. 2 having a mounted wheel 7 as shown in FIGS. 2 and 1B. Top-mounted rotational engagement 5 as shown in FIGS. 1B and 2 provides a similar arrangement to bottom-mounted square wheel 8 FIGS. 1B and 3 for rotation on a circular race 10 for riding on a post 6 having mounted wheel 7 for the spinner cage F FIG. 4. The spinner cage F FIG. 4 contains at least four wind or sail elements 21 in FIG. 1A on the spinner cage F in FIG. 4 and FIG. 1A that provide for engagement with the wind and cause, the rotation of the spinner cage F FIG. 4 bottom mounted on square base 13 of FIGS. 1A and 1B.

Each Spinnersail assembly 21 FIGS. 1A, 1B and 7 consists generally of a flat sheet of steel or aluminum sheet metal or other suitable material and having a combined area great enough to supply the rated power output of the system. To this flat sheet is attached a nosepiece 22 FIG. 7 and FIG. 8A having a semicircular nose segment backed up by a flat triangular impingement surface 23 as shown in FIGS. 8A and 9.

The nosepiece 22 gives the Spinnersail 21 the same effect as the "belly" of a canvas sail. As the wind strikes the Spinnersail 21 the nosepiece 22 turns or directs the flow of wind across the surface of the Spinnersail 21 to cause the Spinnersail 21 to always turn in the direction of the nosepiece 22. The Spinnersails 21 are separated far enough apart so that when the wind strikes the sails in the forepart of the spinner assembly it may, at the same time, flow through the spaces between the foresails to strike the inside surfaces of the rear sails of the cubic structure. Since the nosepieces 22 create the same "belly" effect on the inside surfaces of the rear sails as it does on the outside surfaces of the foresails, the same forward movement is imparted to the rear sails as to the foresails. This movement is further enhanced by a semi-airfoil effect as the rear sails are drawn into a low pressure area caused by the shading of the rear sails when the foresails pass in front of them;

As each Spinnersail 21 mounted at a corner of the cage B as in FIG. 1A moves around the circuit it repositions its attitude toward the wind each time the square cage turns a corner. And, since each Spinnersail 21 collinear with the side of the square cage is repositioned front right, square with the wind, front left, in line with the wind, rear inside left, square with the wind (back inside), back inside right and finally in line with the wind (right side) we find that all four sails are continuously driving forward to garner the greatest possible extraction of energy from the wind.

The width of the sail must not exceed one half the width of each side of the cage. Otherwise the spinner will lose an increasing amount of power equivalent to the amount the sail width exceeds the midpoint. A preferred ration is ⅓ Spinnersail to ⅔ open space per side.

With first means of the conversion process, mentioned above, the spinner converting wind energy starts turning with rotary mechanical energy automatically at very low wind speeds and normally develops adequate turning torque at wind speeds of 10 mph to begin generation. And because it uses rugged sails instead of airfoils or cups, the sails move at speeds very nearly the same as the velocity of the wind striking it. So even at high wind speeds the spinner does not turn at destructive velocities even when the generating load is disconnected.

The sizing of the nosepiece 22 is rather critical. The angle of departure of the impingement surfaces of the nosepiece away from the flat sail surface would be more, or less, than 45 degrees but this 45 degree angle has proven to be best in wind turning effectiveness. Also the diameter of the semi-circular nose segment 22 should be held at approximately 16% of the width of the flat part of the sail. Less than 16% diminishes the "belly" effect of the sail while more than 16% creates an increase in drag as the sail 21 corners into the wind while not increasing the overall effectiveness of the sail appreciably.

Many different wind turbines have been designed with the vertical axis of the Windspinner, however, most of them use radial blades cups or sails having the inner edges perpendicular with the hub. This arrangement means the creation of drag as the back sides of the sails turn against the wind. Triggerwork has been used to turn the sails into a perpendicular approach to the wind or to otherwise shield or by-pass the wind around the drag but these arrangements cannot approach the cost effective, rugged simplicity of the Windspinner.

Also sails similar to the Spinnersail could be hung peripherally around the rims of a round cage. However this would create a much more prolonged draft as the sails turn into the wind. Whereas, with the square cage, the sails switch almost instantly from inside to outside contact with the wind as the cube turns a corner. And even the momentary "square with the wind" position develops very good power because of the action of the nosepiece preventing premature spillage of the wind and loss of power at this position.

Likewise flat sails without the nosepiece could be hung on the corners of the square cage and it would turn but would develop very little power because of spillage and non-directed flow across the sails.

Also square turbines have been built with continuous sails surface all around the perimeter and they will turn if a protuberance such as my nosepiece is added at each corner. But they develop very little power because the surface past the midpoint acts as a very heavy drag.

The preceding spinner cage is a new and novel approach to wind turbine design because of the square cage, the "belly" effect of the nosepiece, the use of limited sail surface at the corners and the use of both sides of the sail. Also it has three dimensions for sizing. As an example, two or more units of the same size as the one shown in this application might possibly be stacked one on top of the other to multiply the output with a minimal change in basic construction.

Figure 13:
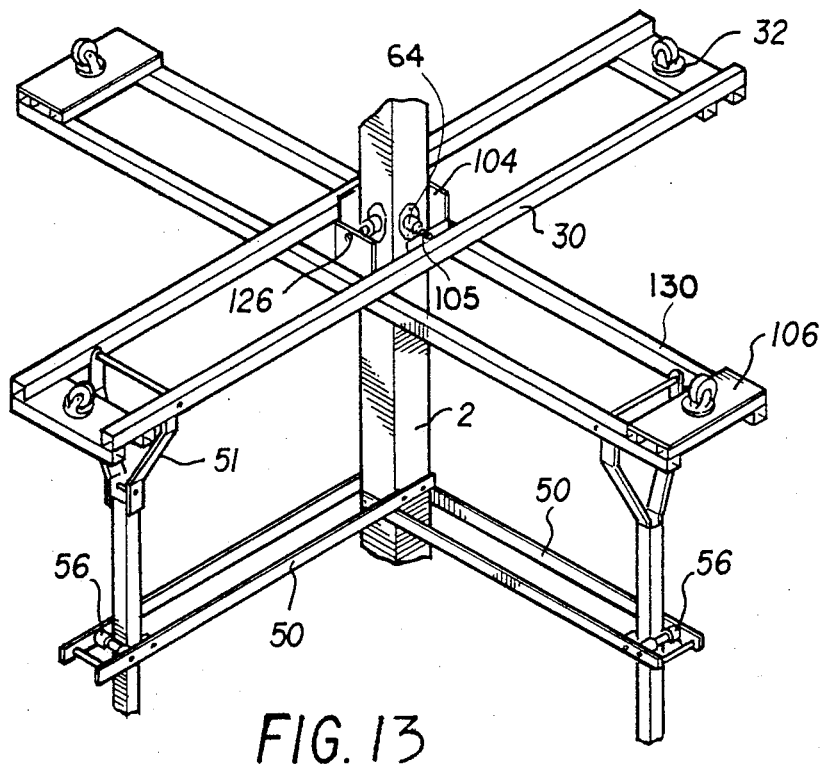
FIG. 13 is the rocker arm assembly.

With second means, rotary mechanical energy is converted to reciprocating energy beneath the bottom-mounted square wheel 8 in FIG. 3 is assembled on the cage F a swash plate 18 FIGS. 1B and 6 mounted by brackets 19 upon an under side of the spinner cage F FIG. 4 which has rotary mechanical energy and providing an inclined work surface for rolling engagement with roller elements or caster followers 32 in FIGS. 1B and 13 mounted at a distal portion of rocker arm 30 in FIG. 13 pivotally located by rocker bearing 64, 108 shown in FIGS. 1B and 13 the rocker arm 108 FIGS. 1B and 18 mounted for conversion to vertical displacement with reciprocating mechanical energy and having upper end 51 of FIG. 1B and lower end 109 of FIGS. 1B and 18. The caster followers 32 of FIGS. 1B and 13 are mounted on the upper end 51 of FIG. 1B of the rocker arm 109 of FIG. 1B for engaging the swash plate 18 of FIGS. 1B and 6 as it rotates with the spinner cage F of FIG. 4.

With third means reciprocating mechanical energy is converted to hydraulic. The rocker arm 108 FIG. 1B drives to convert reciprocating energy to hydraulic energy with a double acting hydraulic cylinder 61 driven by the lower end 109 of FIGS. 1B and 18 of the rocker arm 108 and fluid in the hydraulic cylinder 61 FIG. 18 is applied to a hydraulic drive motor 69 in FIGS. 18 and 19 to convert hydraulic energy to rotary mechanical energy with fourth means for conversion, through conduit 82 to develop rotary motion on a shaft that drives motor-generators 63 of FIG. 18 with selective use of belt drives 67 of FIGS. 18.

With a fifth means converting mechanical energy to electrical energy the electric generators 63 driven by the hydraulic motor 69 produce electric current at terminals at control terminal 72.

Figure 14:
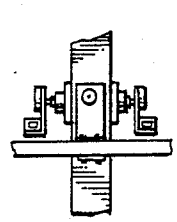
FIG. 14 is an elevation of the bearings of the rocker arms.

The form of the rocker arms 30 may be made form square steel tubing. These arms 30 are bolted or welded to hangar plates 104. These plates are drilled to hold a short shaft 105 of bearing 64 FIG. 14 which is tied to hangar plate 104 FIG. 14 with a set collar welded to the hangar plate. The shaft is held with dual set screws (not shown) tapped into the set collar (not shown). The shaft is inserted into pivot bearing 64 of FIG. 13 which with a similar main bearing arrangement on the opposite side of the shaft allows the rocker arm to pivot freely. Since each of the arms are 90 degrees apart, the two arms 30 and 130 must be separated so that each can pivot without colliding with the other. However, the center of all four bearings 64 of FIG. 13 and also centers of each caster wheel 32 of FIG. 13 must be on the exact same plane. Otherwise, the caster wheels 32 of FIG. 13 would not roll true, losing contact with the swash plate in part of its rotation. To prevent this, the casters 32 of FIG. 13 are hung below the level of the arms 30 and 130 of FIG. 13 on one rocker and above the arm level on the other. The timing is that whenever one rocker has reached the bottom of its movement on one end and the top of the other, the second rocker 130 will be sitting level. The amount of movement will depend on the stroke required by the hydraulic cylinder 61 of FIG. 18.

Figure 15:
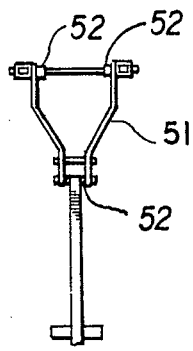
FIG. 15 is a view of the clevis of the rocker arm assembly.
Figure 16:
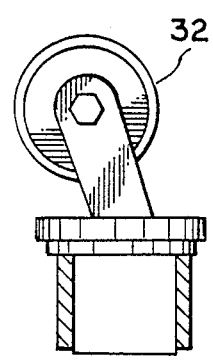
FIG. 16 is an elevation of the caster.
Figure 17:
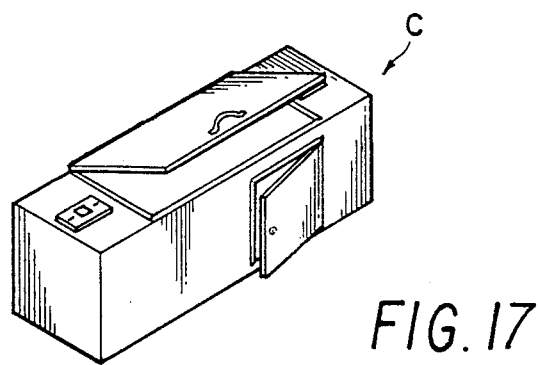
FIG. 17 is a view of the casing of the hydraulic and generator systems.

The bushings 52 of FIG. 13 and 15 are stationary in the clevis 51 of FIG. 1B and 13 and turn on the pin being driven into a fluted hole in the clevis strap 51 to increase the bearing surface.

The swivel casters 32 of FIG. 13 are heavy duty 'upside down' type casters with solid, chilled metal wheels, heavy tapered roller bearings in the wheels and tapered roller bearings in the swivels. They are placed in a socket welded to the underside of plates 106 and held in place with a set screw.

The lower ends of the connecting rods 108 FIG. 18 are tied to the shafts of hydraulic cylinders 61 and 62 of FIG. 19 with stationary clevis 109 of FIG. 19. The cylinders are bolted to plate 111 of FIG. 18. This plate can be moved to effect proper alignment of the connecting rod to the cylinder by loosening the bolts 112 of FIG. 18 and sliding plate 111 of FIG. 18 one way of the other on the base rails 113 of FIG. 18.

The generators, hydraulic motor and jackshaft are all tied to rails 113 which makes it possible to tighten the belts on each motor individually. Each generator has an identical sized sheave 116 and 117 of FIG. 18 so that all generators run at the same speed continuously whenever the hydraulic fluid pressure is high enough to turn the hydraulic motor. All generators 63 and FIG. 18 continue rotation whether they are generating or not.

The hydraulic fluid is stored and cooled in tank 70 of FIGS. 18 and 19. The cabinet is open at the bottom and louvered toward the top to create convection currents for cooling the hydraulic fluid as well as the motor-generators. Fans may be attached to the motors or jack shaft to aid in this cooling if needed in warm climates.

FIG. 21 shows the hydraulic driven electric control which consists of a third hydraulic cylinder 73 FIGS. 19 and 21 which may be identical in size to cylinder 62 of FIGS. 18 and 19. This cylinder 73 has the shafted side of the cylinder piston connected to the high pressure side of the hydraulic circuit 85 of FIG. 19 which is made of high pressure by check valves 86 of FIG. 19. The other unshafted side of cylinder 83 is charged with a compressible fluid pressure such as air, CO2 or other noncondensable gases. It is hermetically sealed with a good thread 'dope' so that once charged the gas cannot escape and the charge is retained permanently. This same operation could be achieved with springs or weights but would be more expensive and cumbersome.

When the windmill is idle, the gas charge drives all of the hydraulic fluid out of the shafted portion of cylinder 73 and the piston rests at the top of its stroke. When the windmill begins to turn, it raises the hydraulic pressure. When this pressure slightly exceeds the pressure of the gas charge in the cylinder, the piston begins to retract which causes a further compression of the gas and a retarding force is created which corresponds to the hydraulic pressure of the system. If the wind energy continues to rise, the pressure on both sides of the piston continues to rise while the piston moves downwardly. This continues until the shaft in its retracting mode allows one of the mercury tilt switches 78 of FIG. 21 to contact its rod 81 of FIG. 21 and in tilting closes an electrical circuit to the first generator. This generation has a tendency to slow everything down and if it slows it down enough, the hydraulic pressure may drop to the point where the switch moves back up enough to lose its tilt and open. However, a time delay switch 91 of FIG. 20 is tied across the switch terminals to hold the circuit closed for as et time period, say two or three minutes, so that whenever the tilt switch is closed and then opens, the time delay holds the circuit closed for its set time interval. This switch may be a Marrs standard hold-on-open time delay switch or the like. This prevents the staccato operation of the magnetic contractor and operates both when the wind is rising and when it is falling.

The generators are in reality simple alternating current motors which operate as generators whenever they are driven faster than their synchronous speed. For instance, if they are designed for 1750 rpm, their synchronous speed is 1800 rpm and they begin generating current at about 1805 rpm. However, the output is small until the speed reaches 1810, 1820, 1830, 1840, etc., so that as the speed rises so does the volume of current generated, and as the generator speed increases, so does its resistive loading so that increasingly higher wind and hydraulic pressure must be available to drive the generator faster. Above 1840 rpm, they may be approaching overload and above 1850 rpm they may break down and burn up if not cut off with an overload protector or other means. When this overload condition is approached, the system uses the generators to brake the system. As an example, when the hydraulic pressure is high enough to drive one generator to full load but not yet high enough to drive another generator on which brakes the speed of the entire system, including the spinner enough to prevent overspeed. If the available power is not enough to carry the other generator, the slowdown drops the hydraulic pressure and opens the combined control switches 78 and 90 of FIG. 20 to the other generator which continues to brake for the time delay period then opens. When the power is adequate to drive both generators, the control switches 78 and 90 of FIG. 20 remains closed and allows both generators to operate continuously. Then when they begin to approach overspeed again, a third generator is set to act as a brake. When all of the available generators are running at full load, the hydraulic pressure is prevented from rising further by operation of pressure relief valve 87. More generators could be added if high wind conditions are encountered often enough to justify the added cost.

The structure must be strongly supported by steel cables as shown in FIGS. 1A and 1B. The upper support cables are attached to either end of the base spokes. They pass through a wheel holder at an obtuse angle then traverse through the main shaft down through the opposite base holder to the base. The lower cable supports run from the base through the main shaft down to the opposite base. Reinforcing sub-base cables span across the lengths of base spokes. In all, eight cables mount form the base spokes to the main shaft while two separate cables stretch across the sub-base. When all of these cables are installed and tightened to an adequate tension, a few drops of silver rich solder are sweated into the upper cables where they pass through the main shaft. This prevents their shifting through the shaft and makes it possible to tighten each cable individually with the turnbuckles or eye bolt terminals. Likewise all cables are attached to the turnbuckles or eye bolts by looping them through the eyes of the terminals, securing and tightening them with cable clamps and finally sweating solder into the cable as it loops through the eye. This strengthens and secures the cable while leaving it so that it can be readily disassembled by lightly heating it. This arrangement has made the cable attachments so reliable that even in the unlikely event that the cable clamps loosen or back off, the clamps would actually have to fall off before the cables let go. The cables only are permeated with solder, but not stuck to the turnbuckle or eye.

Since the main shaft is an integral part of the operating mechanism, it would be difficult to assemble this system in a vertical position. This difficulty is alleviated by constructing the system horizontally, which is done by bolting the base spokes to the lower main shaft and installing and tightening the lower main shaft holding cables 40 of FIG. 1B and the sub-base cables 36 of FIG. 1B. This assembly is then turned over with the base sitting vertical resting on two points of an x-shaped base and the main shaft lying horizontal and resting on a post. The upper main shaft is assembled by adding the wheel holders shim 44, 45 and shaft 4. The upper main shaft is fitted into the lower shaft and bolted. The entire shaft is lying on one or more posts. The support cables are installed and tightened then on this part of the main shaft. Then the square wheels are mounted on the shaft and drawn together with the corner posts and sails. Finally the rocker arms are installed with the connecting rods attached and the system is ready to raise to the vertical position.

Figure 22:
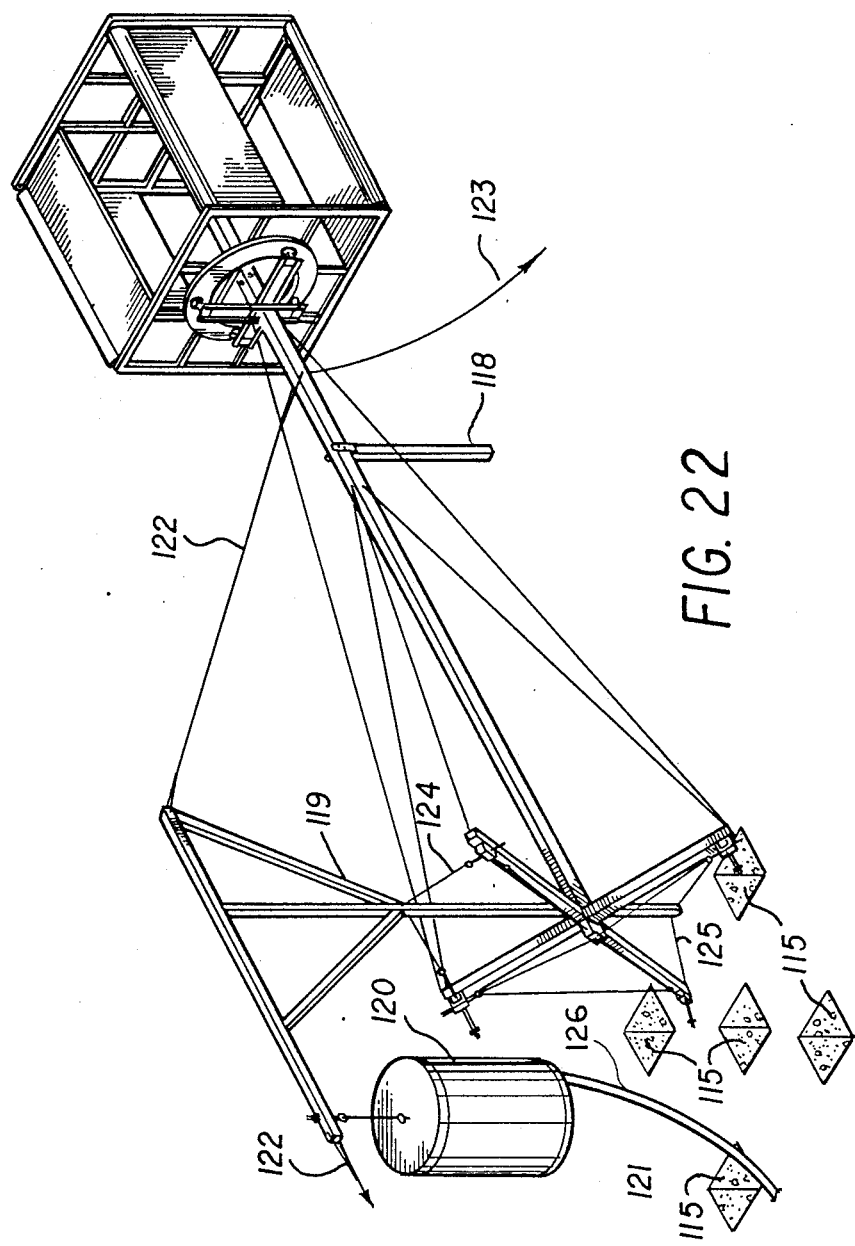
FIG. 22 is a diagrammatic view of the method of erecting the sail assembly.

The system could now be raised with a crane. However, a simple inexpensive system is devised whereby the tower can be raised by only one or two using two ratchet pullers. A gibbet shown in FIG. 22 is raised and tied to the tower with cables 122, 124 and 125. The gibbet has one or two empty barrels 120 suspended from it which are equipped with water hoses 126 which hang to the ground. Two cable pullers are attached to the lines 122, 123 and the pullers may be attached to automobile bumpers or other stationary objects. When everything is ready, water is pumped into the barrels until their weight almost counterbalances the tower, which can them be gently rolled over by pulling with draglines 122 while letting off with line 123. When the tower passes the center of gravity, the water is drained from the barrels and then the tower is gently lowered to its vertical position by cable 123. If measured carefully, the base will now sit with the sub-base structures resting in excavations made for the foundation footings. After the concrete is poured, the machinery cabinet is bolted diagonally across the base spokes and tied to the connecting rods. The machinery cabinet can be completely assembled and the controls preset at the factory so that all the owner must do is tie into the utility lines, and thereby controllably effect wheeling of electricity into the utility system.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to falling within the scope of the invention.

What is claimed and desired to be secured by Letters patent is:

1. Conversion apparatus for changing wind energy to electrical energy comprising;
   first conversion means for converting wind energy to rotary mechanical energy;
   second conversion means for converting said rotary mechanical energy to reciprocating mechanical energy;
   third conversion means for converting said reciprocating mechanical energy to hydraulic energy;
   fourth conversion means for converting said hydraulic energy to rotary mechanical energy and;
   fifth conversion means for converting said rotary mechanical energy to electrical energy.

2. The conversion apparatus of claim 1 wherein said first conversion means includes a revolving spinner cage on which four spinner sail assemblies are contained each spinner sail assembly has a main surface and a nosepiece of a semi-circular impingement surface whereby the nosepiece turns or directs the flow of wind across the main surface of each spinnersail assembly.

3. The conversion apparatus of claim 1 wherein;
   said second conversion means includes a swash plate and brackets, said swash plate mounted on said brackets raised on one side to form an inclined work surface and attached to said spinner cage; and
   a first rocker arm assembly and an upper clevis attached to said first assembly, a second rocker arm assembly connected with said upper end clevis to said first rocker arm assembly caused to rock by said caster followers in engagement with said inclined swash plate work surface;
   whereby the rotary motion of the spinner cage reciprocates the first and second rocker arm, the first rocker arm assembly reciprocating angularly and the second rocker arm assembly reciprocating longitudinally.

4. The conversion apparatus of claim 3 wherein;
   said third energy conversion means includes a piston cylinder and hydraulic fluid arrangement with said piston driven by said second rocker arm assembly;
   said piston exerts pressure on said fluid confined by said cylinder;
   said third energy conversion means further including a hydraulic circuit means and check valves;
   said hydraulic circuit means for feeding an external load to said cylinder and to the check valves insuring high pressure to one side of said circuit, and low pressure to the other side of said circuit.

5. The conversion apparatus of claim 4 wherein;
   said forth energy conversion means includes a hydraulic motor connected across the high pressure side and the low pressure side of the hydraulic circuit.

6. The conversion apparatus of claim 5 wherein;
   the fifth energy conversion means includes at least one generator driven by said hydraulic motor.

7. A spinner sail assembly including;
   sail means for being driven by the wind;
   a square cross-section spinner cage with four sides on which sail means rotates;
   said sail means comprising four sails, each of a width less than one half a side of the said four sides;
   each of said four sails mounted at a corner of the square cross-section cage, the sails being collinear with a respective side of said cage along a width of each of said sails; and
   said sails each mounted with a nosepiece that is a semi-circular segment backed up by a flat triangular surface, and a continuing flat surface portion of said sail comprises most of the width of the sail.

8. The spinner sail assembly of claim 7 wherein;
   said sail semi-circular segment has a diameter that is approximately 16% of the flat portion of the sail; and
   the triangular surface is about 45 degrees from the flat surface.

* * * * *